United States Patent [19]

Norris et al.

[11] 4,250,703
[45] Feb. 17, 1981

[54] SWINGING DOOR PARTICLE SEPARATOR AND DEICING SYSTEM

[75] Inventors: Richard M. Norris, Stratford; Joseph P. Murphy, Newtown, both of Conn.

[73] Assignee: Avco Corporation, Stratford, Conn.

[21] Appl. No.: 21,422

[22] Filed: Mar. 15, 1979

[51] Int. Cl.³ .............................................. F02G 3/00
[52] U.S. Cl. ................................. 60/39.09 P; 55/306
[58] Field of Search ................. 60/39.09 P; 137/15.1; 55/306

[56] References Cited

U.S. PATENT DOCUMENTS

| | | | |
|---|---|---|---|
| 2,381,705 | 8/1945 | Vokes | 55/306 |
| 2,623,610 | 12/1952 | Buechel | 55/306 |
| 2,970,431 | 2/1961 | Harshman | 137/15.1 |
| 3,338,049 | 8/1967 | Fernberger | 60/39.09 P |
| 3,952,972 | 4/1976 | Tedstone et al. | 60/39.09 P |

Primary Examiner—Carlton R. Croyle
Assistant Examiner—Edward Look

Attorney, Agent, or Firm—Ralph D. Gelling

[57] ABSTRACT

In a gas turbine engine, a duct is constructed extending axially and communicating directly, through a transverse opening, with the engine plenum. The plenum extends upward into the engine nacelle and connects with the inlet to the compressor of the gas turbine engine. A portion of the air entering the duct is drawn into the plenum. The remainder is exhausted out of the rear portion of the duct. To create inertial separation, a door is mounted on a lever arm which may be rotated between two positions. In one position the door partially closes the entrance to the plenum causing the airflow to turn through a greater angle in order to enter the plenum. The turning motion of the airflow divides the particles of heavier mass to the outside of the turn. These particles will be exhausted from the rearward exit of the duct. In a second position the door closes the rear portion of the duct so that the entire volume of air entering the duct is supplied to the engine plenum.

4 Claims, 3 Drawing Figures

SWINGING DOOR PARTICLE SEPARATOR AND DEICING SYSTEM

BACKGROUND OF THE INVENTION

The functioning of a gas turbine engine depends on a continuous flow of a large volume of air through the components of the engine. Since these components, for example, the compressor rotor, are rotating at extremely high speeds any contaminants in the airflow will have a destructive effect on engine performance. Particles, such as super-cooled water droplets, impinging on the rotor may cause an imbalance and an eventual disintegration because of the high forces involved. It is, therefore, essential that some means be employed to separate contaminants from the airflow entering the engine plenum. In the past, a great variety of barrier filters were employed; however, these filters had the disadvantage of encouraging the formation of ice in the inlet which can eventually block the inlet and prevent the flow of air into the engine.

Inertial separator devices have been used to divide the particles of heavier mass in the inlet airflow away from the engine intake through a by-pass duct. A typical system of this type is described in U.S. Pat. No. 3,329,377 which issued on July 4, 1967. In this system a hinged deflecting vane is placed in the inlet duct upstream of the intake to the engine plenum. The vane extends into the duct restricting the airflow. The airflow is caused to accelerate and turn through a substantial angle around the deflecting vane. Particles of heavier mass cannot make the turn and are exhausted through a by-pass duct. The hinged nature of the vane allows the adjustment of the ratio of air by-passed. Since the deflecting vane is attached to the forward wall of the entrance to the engine plenum, it is always in the way of the airflow even at full retraction. This results in a pressure loss and prevents maximum ram air operation, resulting in an unnecessary limitation of engine performance.

SUMMARY OF THE INVENTION

An improved particle separator and deicing system is constructed for use in the inlet duct of a gas turbine engine. The inlet duct extends axially along the nacelle of the engine beginning with a forward facing entrance and terminating in a rearward facing exit. In the intermediate portion of the duct an opening is formed which communicates with the engine plenum. The entrance is constructed to allow the flow of a high volume of air during periods which require high performance. A swinging door is mounted in the entrance to the plenum on a lever arm which is pivotally connected to the engine structure. An actuating mechanism is provided to swing the door from a position where it partially closes the entrance to the plenum to a position where it completely closes the exit portion of the duct. In the particle separation mode the door is swung into the plenum entrance. This requires the incoming airflow to bend through an increased angle before entering the engine. Particles of higher inertia, such as ice, will separate and be exhausted through the exit of the duct. When full performance is required of the gas turbine engine, the swinging door may be moved to a position where it closes the exit of the duct. The invention is described in more detail below with reference to the attached Drawing and in said Drawing:

DESCRIPTION OF THE PREFERRED EMBODIMENT

Figure 1:
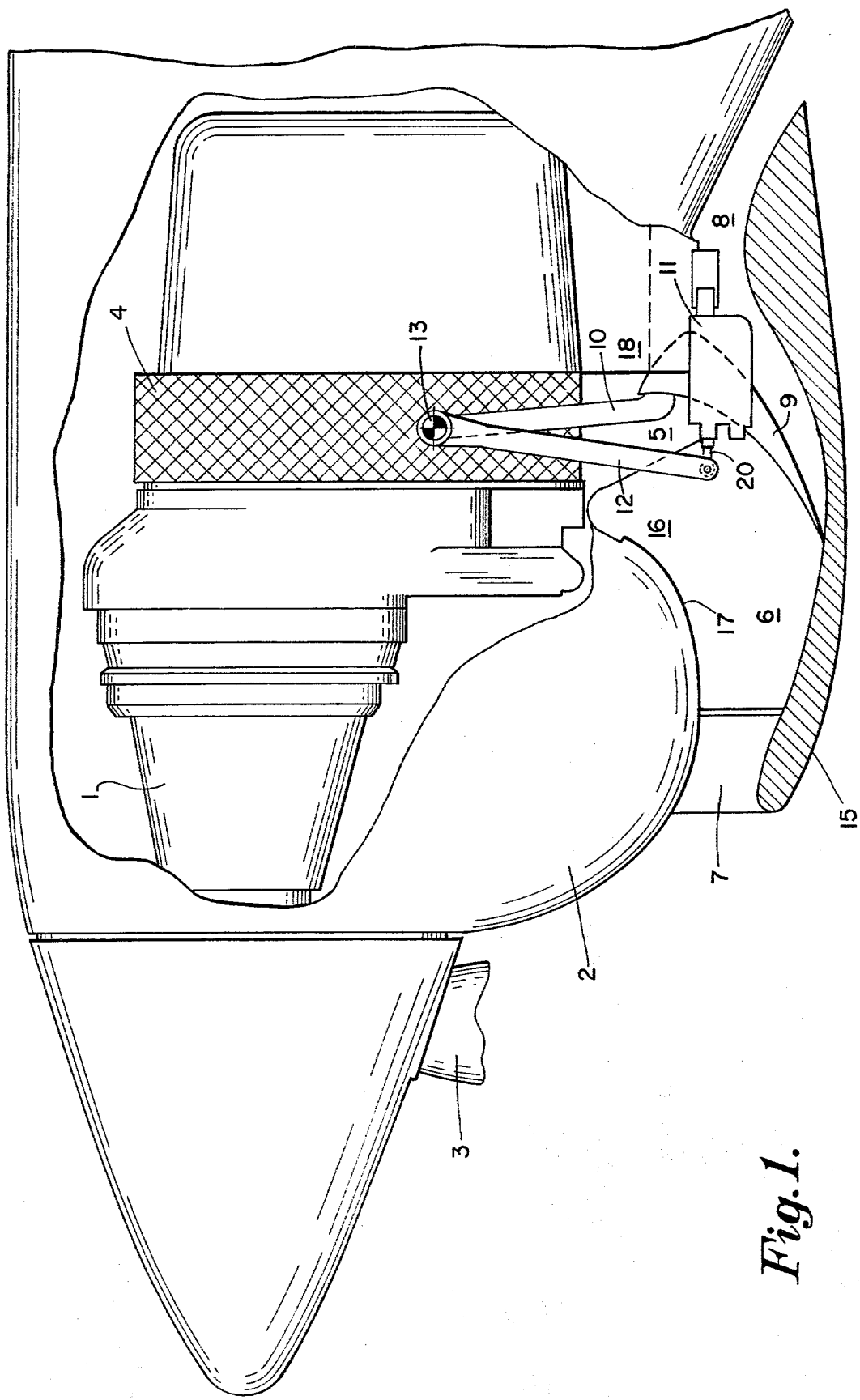
FIG. 1 is a drawing of the nose portion of an engine nacelle cut away to show the gas turbine engine and its inlet duct.

Referring now to the drawings, there is shown in FIG. 1, a gas turbine engine 1 mounted and enclosed in the nose portion of an engine nacelle 2. The engine 1 is connected to drive the propeller 3 which creates the thrust for moving the aircraft. Air is supplied to the engine through intake 4 which communicates with annular plenum 5.

Figure 2:
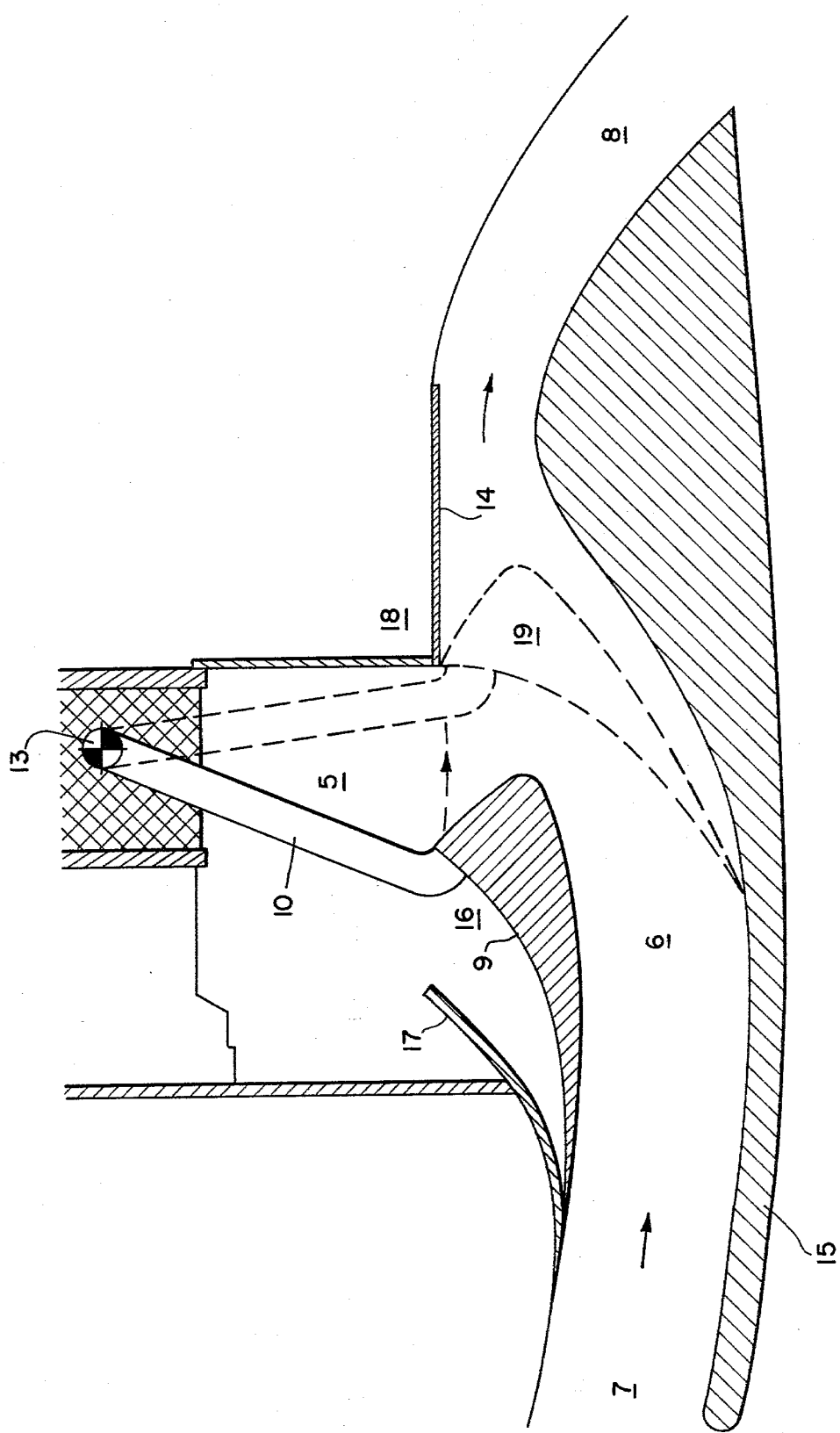
FIG. 2 is a schematic diagram of the particle separator system of this invention.

An inlet duct 6 is constructed at the bottom of nacelle 2 and is defined by a scoop 15. The duct 6 extends axially from a forward facing inlet 7 to a rearward facing exit 8. In the intermediate portion of the duct, an opening 16 is constructed in the nacelle 2 to provide an entrance for incoming airflow to the engine plenum 5. The entrance is formed between a curved wall portion 17 and a corner section 18. A swinging door 9 is mounted on a lever arm 10 in entrance 16. The lever arm 10 is fixed to an axle 13 which is rotatably mounted on a portion of the engine support structure (not shown). Rotation of axle 13 will move door 9 from a forward position, as shown in FIG. 2, to a rearward position, as shown by phantom lines 19 in FIG. 2.

The door 9 is shaped to form an extension of curved surface 17 into the entrance 16 of the plenum thereby forcing the inlet airflow to turn through a greater angle before entering the plenum. This increased angle creates an inertial separation effect which divides the heavier particles in the airflow to the outside of the turn. The higher inertia of these particles prevents their turning and carries them past the corner surface 18 and out of the exit 8 of duct 6. In this manner the ingestion of ice and other contaminants into the engine intake is prevented. Under some conditions a coating of ice may build up on corner section 18. In order to prevent this, a heater 14 may be constructed on surface 18 as shown. Heater 14 may be energized by bleeding hot exhaust air from the engine.

During periods of use when particle separation is not required or where peak performance is necessary, the swing door 9 may be moved to a rear position where it engages corner wall portion 18 and extends across duct 6 to block exit 8. In this position full ram air is provided to the engine intake.

Controlled rotation of axle 13 can be obtained by employing an air cylinder 11 which may be powered by engine bleed air. The piston rod 20 is connected to an operating lever 12 which in turn is fixed to axle 13. Actuation of cylinder 11 will move the swing door 9 between its forward and rear positions.

The swing door 9 is designed to conform to the shape of duct 6 without restricting the airflow therein. This minimizes any performance penalty which may result from the particle separator function.

ALTERNATE EMBODIMENT

Figure 3:
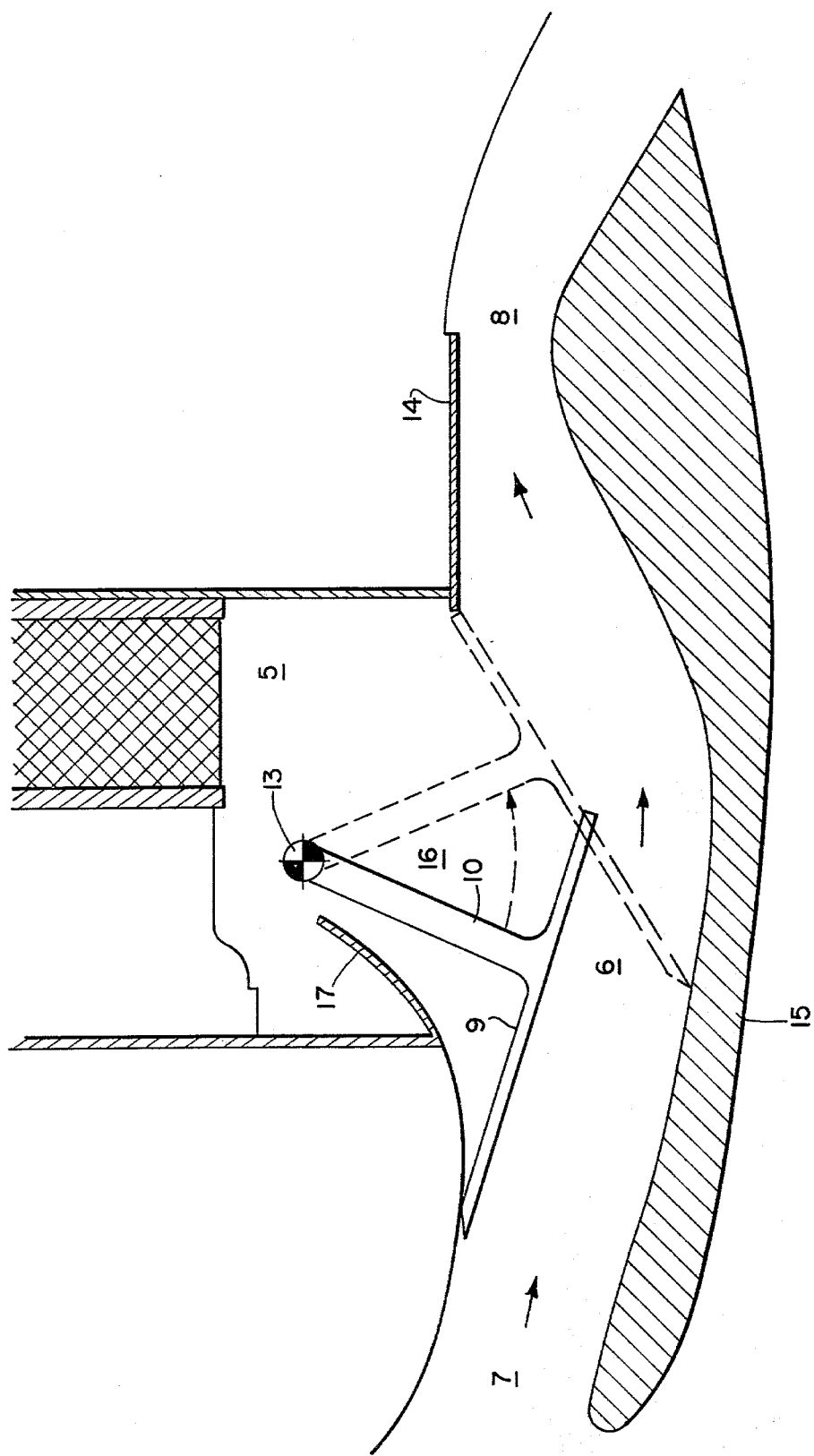
FIG. 3 is a schematic diagram of an alternate embodiment.

The swing door 9 may be constructed in the form of a flat plate, as shown in FIG. 3. This door, in the particle separation mode, will be moved to a fixed position where it will extend into the duct to deflect the airflow through an even greater angle, thereby increasing the efficiency of the separation effect. By swinging the door to its rearward position full ram air is supplied to the engine plenum in a manner similar to the embodiment shown in FIG. 2.

In the manner described above an efficient deicing and particle separator system is provided while allowance is made for maximum ram air during certain operations. The preferred embodiment minimizes any performance penalties involved.

We claim as our invention:

1. A particle separator and deicing system for the inlet of a gas turbine engine which is enclosed in a nacelle of an aircraft comprising:

a housing extending outward from the exterior of the nacelle and being constructed with an axially extending longitudinal duct; said duct having a forward facing inlet and a rearward facing outlet to allow for the flow of air; an opening is constructed in an interior wall of the housing adjacent to the nacelle, said opening communicating with the intake plenum of the gas turbine engine, and the duct, to form an entrance for the flow of air into the plenum;

a door mounted in the entrance to the plenum for movement between a first position and second position, where in the first position the door extends partially across the entrance to the plenum to force the airflow entering the plenum to bend through a substantial angle thereby causing particles of significant mass in the airflow to be separated by inertia and exhausted through the outlet of the duct; and in the second position the door blocks the rearward facing exit to force substantially all of the air entering the duct to flow into the engine plenum; and actuating means operatively associated with the door to move said door between the first and second positions.

2. A particle separator and deicing system for the inlet of a gas turbine engine enclosed in a nacelle of an aircraft as described in claim 1 wherein the door is designed to conform to the shape of the duct without restriction of the flow area of the duct.

3. A particle separator and deicing system for the inlet of a gas turbine engine which is enclosed in a nacelle of an aircraft as described in claim 1 wherein the door is designed in the form of a flat plate and is constructed to extend into the duct to restrict the airflow in the duct immediately upstream of the plenum entrance when the door is in the particle separation mode.

4. A particle separator and deicing system for the inlet of a turbine engine which is enclosed in a nacelle of an aircraft as described in claim 1 wherein the actuating means comprises:

an axle mounted for rotation in the vicinity of the plenum entrance;

at least one lever arm fixed to the axle and extending into the plenum entrance to receive the door;

an air cylinder, the piston of which being operatively connected to the axle to cause rotation thereof upon actuation of the air cylinder; and a source of high pressure air supplied to the air cylinder to control the actuation thereof.

* * * * *